United States Patent

[11] 3,625,931

[72] Inventors Masatomo Ito
 Yokohama;
 Soyao Moriguchi, Kawasaki; Junji
 Yotsuyangi, Yokohama; Masao Miyamoto,
 Kohza-gun, all of Japan
[21] Appl. No. 33,075
[22] Filed Apr. 29, 1970
[45] Patented Dec. 7, 1971
[73] Assignees Showa Denko Kabushiki Kaisha
 Tokyo, Japan;
 Japan Olefin Chemicals Co., Ltd.
 Tokyo, Japan, part interest to each
[32] Priorities May 6, 1969
[33] Japan
[31] 44/34051;
 May 6, 1969, Japan, No. 44/34052; May 6,
 1969, Japan, No. 44/34053

[54] ANTISTATIC THERMOPLASTIC RESIN
 10 Claims, No Drawings
[52] U.S. Cl. .................................................. 260/92.8 A,
 260/75 N, 260/78 S, 260/85.5, 260/88.7,
 260/89.1, 260/93.5 A, 260/93.7, 260/94.9 GB
[51] Int. Cl. ........................................................ C08f 45/00
[50] Field of Search ........................................... 260/94.9 G,
 93.5 A, 92.8 A, 85.5 R, 85.5 S, 93.7, 88.7, 89.1, 78
 S, 75 N, DIG. 15, DIG. 19

[56] References Cited
UNITED STATES PATENTS

| 2,891,027 | 6/1959 | Coler et al. | 260/32.6 |
| 2,922,771 | 1/1960 | Coler et al. | 260/31.2 |

Primary Examiner—Joseph L. Schofer
Assistant Examiner—Edward J. Smith
Attorney—Sherman and Shalloway ABSTRACT: A composition of matter comprising a thermoplastic resin and, as an antistatic agent, N,N'-substituted xylylene diamine. Because of a stability of the antistatic agent used, no fuming phenomenon occurs during fabrication of the composition, and the resulting fabricated articles have good antistatic properties and are free from surface clouding.

ANTISTATIC THERMOPLASTIC RESIN

This invention relates to a thermoplastic resin composition having improved antistatic properties, and more particularly to a thermoplastic resin composition containing a small amount of an N,N'-substituted xylylene diamine as a novel antistatic agent.

Thermoplastic resins have found wide applications in architectural materials, industrial materials, miscellaneous articles for daily uses, and so on. But because of their high electrically insulating properties in general, these resins readily generate electrostaticity owing to friction or the like during manufacturing, processing or actual use. The electrostatic buildup causes the resins to attract dirt and dust in the air, resulting in the deterioration of their appearances and therefore a decrease in commercial value. Sometimes, there is even a damage caused by electric shock. All this constitutes a serious problem yet to be solved.

Various attempts have been made heretofore to prevent such static charge of thermoplastic resins. For instance, it was proposed to decrease the electrical resistance of the surface of a molded article of a thermoplastic resin by applying various types of surface active agents as antistatic agents to the surface according to the coating, spraying or immersion technique. There was also a proposal in which the electric conductivity of the surface of a resin is increased by kneading various antistatic agents with the resin during the molding or pelletizing operation. The first-mentioned method has the disadvantage that an antistatic effect cannot be maintained for a long time because the antistatic agent deposited on the surface of the molded article comes off through use. The latter method, however, can be practised by a simple operation, and has the advantage that the antistatic agent kneaded into the entire mass of the resin gradually migrates to the surface of the resin and maintains the antistatic effect for a longer period of time. Hence, the latter-mentioned method is generally used at present except in a certain kind of resin articles.

Many compounds having a good antistatic effect have heretofore been proposed. But these antistatic agents have a common defect of low thermal stability. When a kneaded mixture of a thermoplastic resin and such an antistatic agent having a low thermal stability is processed on a molding machine, fuming occurs, for instance, at a die portion of the machine because of sublimation, evaporation or decomposition by heat of the antistatic agent, and causes the contamination of the molding machine and molded resins.

A defect of the conventional antistatic agents is its poor compatibility with the resins. Antistatic agents having a low compatibility migrate from the inside of a molded resin to its surface with excessive rapidity, and result in the contamination of the resin surface in a relatively short period of time. Such excessive migrating phenomenon of the antistatic agent is generally described as bleeding out or blooming. Fine particles or fine crystals of an antistatic agent that has bled out onto the resin surface gradually agglomerate with one another or grow, and cause whitish clouding on the surface of the molded article of resin. This phenomenon is prominent particularly when the molded resin article comes in contact with polar materials. Accordingly, this phenomenon may also be called "surface clouding." If the molded resin article is a stretched, transparent film, surface clouding is especially markedly detrimental to the commercial value of the molded article.

Of the various antistatic agents heretofore proposed, typical compounds having a marked antistatic effect and being widely employed include N-substituted aliphatic amines or amides, such as N,N-di(hydroxyalkyl) substituted alkyl amines or amides (for instance, British Pat. Specification No. 906,174), and N,N'-substituted aliphatic diamines, such as N,N'-tetra(hydroxyalkyl) substituted alkylene diamines (for instance, U.S. Pat. Nos. 2,891,027–32 and Nos. 2,922,770–73). These compounds, however, cannot be free from the defects of low thermal stability and surface clouding described above.

It has now been found that N,N'-substituted xylylene diamines can be used as excellent antistatic agents. These compounds have good antistatic properties and high thermal stability, and do not cause surface clouding. These compounds according to the present invention essentially differ from the known antistatic agents of the aliphatic amine type in that they are of the aralkylene diamine type in which the nitrogen atom each of the two amino groups is attached to the benzene ring via the methylene group. Such a skeletal structure is believed to contribute to the properties desirable for antistatic agents.

The N,N'-substituted xylylene diamines used as antistatic agents in the present invention are expressed more specifically by the following general formula (I)

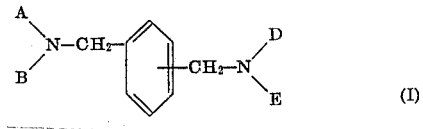

Wherein the substituents A, B, D and E are each selected from the following radicals (a) $-(CH_2-CHO)_m-C-R^1$
                $|$     $\|$
                $R$    $O$ (b) $-(CH_2-CHO)_n-C-R^2$
                $|$     $\|$
                $R$    $O$ (c) $-(CH_2-CHO)_nH$,
                $|$
                $R$ d. $-R^3$, and e. $-R^4$ wherein R is a hydrogen atom or a methyl group, $R^1$ is a linear or branched alkyl or alkenyl group having 11–21 carbon atoms, $R^2$ is a linear or branched alkyl or alkenyl group having one to 10 carbon atoms, $R^3$ is a linear or branched alkyl or alkenyl group having one to 21 carbon atoms, $R^4$ is a hydrogen atom, a cycloalkyl group, an aralkyl group or an aryl group, $m$ is an integer of 0 to 5, and $n$ is an integer of 1 to 5, and at least one of the substituents A, B, D and E represents the radical $(a)$.

Of the compounds represented by the formula (I), derivatives of m- or p-xylylene diamines, especially their para derivatives are preferred, and mixtures of meta- and para derivatives are preferably used. Depending upon the combinations of the substituents A, B, D and E, many compounds come under the formula (I). Some of the typical examples will be illustrated in the examples appearing later in the specification.

The compounds of the formula (I) can be prepared by ordinary chemical synthesizing means. For example, derivatives having the group

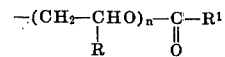

as the substituent can be prepared by reacting xylylene diamine with ethylene oxide or propylene oxide to introduce the group

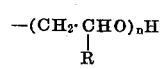

into the nitrogen of the amine, and esterifying it with a linear or branched fatty acid, $R^1COOH$.

Most of the compounds having the formula (I) are solid at room temperature. The compounds in which $R^1$ of the acyl group

is a branched alkyl or alkenyl group, for instance, iso-stearoyl, are liquid at room temperature, and have very desirable properties as antistatic agents.

All of the compounds of the formula (I) impart a desirable antistatic effect to thermoplastic resins. Within the term thermoplastic resins are included polymers of ethylene, propylene, styrene, vinyl chloride, vinyl acetate and acrylonitrile, copolymers with each other, polyamides, and polyesters. Application of these antistatic agents to thermoplastic resins is effected by the customary methods described hereinabove. In other words, a solution of the agent in a suitable solvent is deposited on the surface of a molded article of the resin by coating, spraying or immersion. Or the agent is kneaded with the resin during pelletization of the resin or molding of articles. Kneading the agent with resins is the most advantageous method since the antistatic agent of the invention has a high thermal stability as compared with the conventional agents and does not cause surface clouding.

The antistatic agent of the formula (I) according to the invention can be applied to thermoplastic resins, either alone or in combination of other types of antistatic agents. The former case will first be described. When at least one compound of the formula (I) is kneaded into a resin in an amount of 0.01–10 percent, preferably 0.2–2 percent, based on the weight of the resin, the desired antistatic thermoplastic resin composition results. Since these antistatic agents have a high thermal stability, no fuming occurs during the thermoforming of the resin composition at high temperatures, and the resulting molded articles have good antistatic properties and do not undergo surface clouding. The compounds of the formula (I) are such that at least one of the substitutents A, B, D and E should be the radical (a).

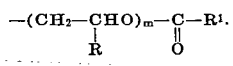

However, when the antistatic agents according to the invention are applied alone as mentioned above, compounds having a larger number of radical (a) have a greater tendency to decrease somewhat in antistatic property. Accordingly, the choice of compounds having a lesser number of radicals (a) and at least one radicals (c), ω-hydroxyalkyl is recommended.

Now, the second case wherein the compounds of the formula (I) are used conjointly with other types of antistatic agents will be described.

The compounds of the formula (I) can be applied to the thermoplastic resin in combination with other types of antistatic agents. It has now been found surprisingly that when the compound of the formula (I) is used in combination with an antistatic agent of the following formula (II), an effect obtained thereby is not a mere sum of the effects obtained by these two types of antistatic agents used singly, but a synergistic one. The conjoint use of both types of the compounds, therefore, constitutes one of the important features of the present invention.

The antistatic agent used in combination with the compound of the formula (I) is an N-substituted amine or amide expressed by the following formula (II)

$$H(OCH \cdot CH_2)_p - \underset{X}{N} - (CH_2 \cdot \underset{R'}{CHO})_q H \qquad (II)$$

wherein R and R' are a hydrogen atom or a methyl group, X is a linear or branched alkyl or aliphatic acyl group having 11–22 carbon atoms, and p and q are integers of from 1 to 5.

Many of the compounds expressed by the formula (II) have heretofore been used as antistatic agents. Although these compounds can impart good antistatic properties to resins, they have the defect that because of their own low thermal stability, fuming occurs during the thermoforming of the resins, and they cause surface clouding of the resulting formed articles. However, when suitable proportions of the compounds of the formulas (I) and (II) are conjointly used in accordance with the present invention, no such defect is observed, and unexpectedly excellent antistatic effects can be obtained.

It has been known that of the compounds having the formula (II), those in which X is a linear alkyl or acyl group can be used as antistatic agents. It has however been discovered that the compounds wherein X is a branched alkyl or aliphatic acyl group, i.e., isostearyl or isostearoyl are liquid at room temperature in contrast to the fact that compounds in which X consists of a linear carbon chain are generally solid, and that they hardly cause the surface clouding of molded articles of the resin. Thus, the compounds containing branched chains can be utilized very favorably in combination with the compound of the formula (I).

The compounds of the formula (II) can be prepared by ordinary chemical synthesizing methods in the same way as mentioned before with respect to the preparation of the compounds expressed by the formula (I). In the preparation of a compound in which X is an isostearyl or isostearoyl group, isostearic acid is used as one starting material. The isostearic acid is a liquid substance available as a byproduct in the commercial production of oleic acid. For instance, it is produced by Emery Industries, Inc., U.S.A. and sold under the trade name Emery-871 or Emery-3185-D. Such byproduct isostearic acid is a mixture of isostearic acids having a different position of side chains, and the mixing proportions vary according to various factors of production. Accordingly, the compounds of the formula (II) vary somewhat in properties according to the variations of the starting isostearic acid described above, but all of them are liquid at room temperature and having a freezing point of −20°±5° C.

When the compound of the formula (I) is used in combination with the compound of the formula (II), it is proper that the compound of the formula (I) is used in an amount of 0.05–10 percent, preferably 0.1–2 percent, based on the weight of the resin and the compound of the formula (II), in an amount of 0.01–2 percent, preferably 0.05–1 percent, based on the weight of the resin, and that the ratio of compound (I) to compound (II) is in the range of 9:1 to 3:7.

A thermoplastic resin having incorporated therein both the compounds (I) and (II) exhibits greater antistatic properties than one containing the compound (I) or (II) singly. Furthermore, it does not fume during thermoforming, nor does it cause any surface clouding of the resulting formed articles.

The synergistic effect obtained by the conjoint use of the compounds of the formulas (I) and (II) is greater when the number of the substituent (a),

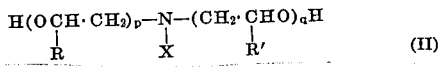

in the compound of the formula (I) is greater. This is interesting in view of the fact that in the case of applying the compound of the formula (I) singly, compounds having lesser number of substituent (a) are preferably selected.

The thermoplastic resin composition containing both the compounds (I) and (II) is especially useful when the intended final product is a stretched material of the thermoplastic resin. The stretched material means a monoaxially stretched tape, a biaxially stretched film, stretched filaments and the like. Heretofore, various antistatic agents effective for nonstretched articles of resins have been known. Most of them are hardly effective for stretched materials. Even those kinds of antistatic agents which are effective to some extend on the stretched articles cannot exhibit their effects unless used in great quantities. This leads to vigorous fuming at the time of thermoforming, and makes the forming operation very difficult. In addition, such large amounts of antistatic agents damage the inherent properties of the resins, and always cause the surface clouding of the stretched articles. If the stretched article is a transparent, stretched film, occurrence of clouding on its surface with the passage of time constitutes a serious setback. Such hitherto unavoidable problem has been solved for the first time by the present invention.

When the antistatic agents of the invention are applied to stretched resin materials, suitable amounts of the compounds (I) and (II) are 0.1–10 percent, preferably 0.3–3 percent, and 0.01–2percent, preferably 0.1–1 percent, respectively based on the weight of the resin, and the ratio of compound (I) to compound (II) is 9:1 to 3:7. Besides, it is preferred that at least two of the substituents A, B, D and E in the compound of formula (I) should be radical (a),

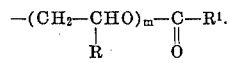

$$-(CH_2-CHO)_m-C-R^1.$$
$$\phantom{-(CH_2-C}|\phantom{O)_m-}\|$$
$$\phantom{-(CH_2-C}R\phantom{HO)_m-}O$$

It is more preferred that all of the four substituents are radical (a).

The antistatic compounds of the invention described above do not adversely affect the strength, transparency, printability, heat-sealing property, and other properties of a thermoplastic resin.

The invention will further be described by the following illustrative examples in which parts are by weight unless otherwise specified. The antistatic properties of the molded articles of resin were tested by the measurement of the surface resistivity or ash test, and the surface clouding and the fuming phenomenon were observed by the naked eye.

| | |
|---|---|
| Surface resistivity: | Measured in a customary manner in an atmosphere at 20° C. and a relative humidity of 65 percent. |
| Ash test: | A surface area of 5×10 cm. of a specimen was rubbed 10 times with a cotton cloth, and then caused to approach tobacco ash until it attracted the ash. The distance of attraction was measured. |
| Surface clouding index: | A specimen of the resin composition was maintained in contact with newspaper (polar material) for a certain period of time. Thereafter, a degree of bleeding out of the antistatic agent onto the surface of the resin and clouding of the surface was observed by the naked eye, and rated on a scale of from 1 to 5 as follows: |
| | 1: no occurrence of clouding |
| | 2: slight clouding |
| | 3–5: progressively damaging the surface owing to clouding (products of these grades are not serviceable) |
| Fuming index: | An amount of fuming from the die portion of a molding machine during the thermoforming of resins was observed, and rated on a scale of from 1 to 5 as follows: |
| | 1: hardly any fuming |
| | 2: slight fuming |
| | 3–4: amount of fuming is such that the rolls of the molding machine are contaminated |
| | 5: a great amount of fuming and the contamination of the rolls to an extent that molding becomes impossible |

EXAMPLE 1

One hundred parts of polypropylene having a melt flow index of 2 was kneaded uniformly with 0.5 part of each of the below-mentioned antistatic agents. Each of the compositions obtained was molded into a 40 $\mu$ thick T die film.

No. 1:  N,N,N'-tris($\beta$-hydroxyethyl)-N'-stearoyl-m-xylylene diamine
No. 2:  N,N,N'-tris($\beta$-hydroxyethyl)-N'-($\beta$-stearoyloxyethyl)-p-xylylene diamine
No. 3*(*The antistatic agent No. 3 is a known one, and is a comparative run.)  N,N'-($\beta$-hydroxyethyl)stearyl amine The fuming condition the time of extrusion-molding was observed, and the surface resistivity and surface clouding of the molded articles after a lapse of one week were detected. The results are as follows:

| Antistatic agent | Surface resistivity($\Omega$) | Fuming index | Surface clouding index |
|---|---|---|---|
| None (control) | $10^{16}$ or more | 1 | 1 |
| No. 1 | $2.3 \times 10^{11}$ | 1 | 1 |
| No. 2 | $4.1 \times 10^{9}$ | 1 | 1 |
| No. 3 | $8.5 \times 10^{9}$ | 4 | 5 |

EXAMPLE 2

One hundred parts of low density polyethylene having a melt index of 3 were uniformly kneaded with 0.3 part of each of the antistatic agents nos. 1, 2 and 3 described in example 1. Each of the resulting compositions was molded into a 40 $\mu$ thick film by the inflation method. The temperature of the die portion of the extruder was 160° C., and a ratio of expansion of the film was 2.0. The surface resistivity and surface clouding index of each film after a lapse of one week from the preparation were determined. The results are shown below.

| Antistatic agent | Surface resistivity($\Omega$) | Surface clouding index |
|---|---|---|
| None (control) | $10^{16}$ or more | 1 |
| No. 1 | $4.5 \times 10^{10}$ | 1 |
| No. 2 | $3.1 \times 10^{10}$ | 1 |
| No. 3 | $8.1 \times 10^{9}$ | 3 |

EXAMPLE 3

One hundred parts of polystyrene having a melt index of 0.4 were kneaded uniformly with 2 parts each of the antistatic agents nos. 1 and 2 described in example 1. Each of the resulting compositions was molded into a sheet having a thickness of 5 mm. by means of an injection molding machine at a temperature of 210° C.

The resulting sheets were left to stand for 48 hours in a constant temperature chamber maintained at 20° C. and relative humidity of 65 percent, and then the surface resistivity of each sheet was measured. The results are as follows:

| Antistatic agent | Surface resistivity($\Omega$) |
|---|---|
| None (control) | $10^{16}$ or more |
| No. 1 | $4.5 \times 10^{10}$ |
| No. 2 | $1.2 \times 10^{10}$ |

EXAMPLE 4

Thirty parts of dioctyl phthalate as plasticizer, 1.5 parts of cadmium stearate and 1.5 parts of dibutyl tin dilaurate, and 1 part of each of the antistatic agents nos. 1 and 2 used in example 1 were added to 100 parts of polyvinyl chloride having a degree of polymerization of 1200. Each of the resulting compositions was uniformly kneaded by a roll, and molded into a sheet having a thickness of 5 mm. by press fabrication at a press temperature of 180° C. After allowing the sheets to stand for 48 hours in a constant temperature chamber maintained at 20° C. and a relative humidity of 65 percent, the surface resistivities of the sheets were measured. The results are as follows:

| Antistatic agent | Surface resistivity (Ω) |
|---|---|
| None (control) | $10^{16}$ or more |
| No. 1 | $9.6 \times 10^{10}$ |
| No. 2 | $7.3 \times 10^{10}$ |

EXAMPLE 5

One each of the various antistatic agents indicated in table 1 was added to 100 parts of polypropylene having a melt flow index of 2, and they were mixed uniformly. Each of the compositions so obtained was pelletized by means of an extruder. The temperature of the die portion of the extruder was 270° C. The fuming condition was observed. Thereafter, the pellets were press fabricated to make a sheet having a thickness of 5 mm. at a press temperature of 190° C.

After allowing the sheets to stand for 48 hours in a constant temperature chamber maintained at 20° C. and a relative humidity of 65 percent, the surface resistivities and surface clouding indices of the sheets were measured. The results are shown in table 1.

Compounds of the general formula (I):

Compound No.

1. N,N,N',N'-tetrakis (β-n-laurolyloxymethyl)-m-xylylen diamine
2. N,N,N',N'-tetrakis (β-n-stearoyloxyethyl) xylylene diamine (mixture of meta:para=7:3)
2'. Same as (2), but isostearoyl compound
3. N,N'-bis (β-n-stearoyloxyethyl)-N,N'-bis (n-stearoyl)-p-xylylene diamine
3'. Same as (3), but isostearoyl compound
4. N,N,N'-tris (β-n-stearoyloxyethyl)-N'-n-stearoyl-m-xylylene diamine
4'. Same as (4), but isostearoyl compound
5. N,N,N',N'-tetrakis (β-n-oleoyloxyethyl)-m-xylylene diamine Compounds of the general formula (II):

Compound No.

6. N,N-bis (β-hydroxyethyl)lauryl amine
7. N,N-bis (β-hydroxyethyl)-n-stearyl amine
7'. Same as (7), but isostearyl compound
8. N,N-bis (β-hydroxyethyl)-n-stearoyl amide
8'. Same as (8), but isostearoyl compound

TABLE 1

| Run No. | Substituent A | Substituent B | Substituent D | Substituent E | Surface resistivity | Fuming index | Surface clouding index |
|---|---|---|---|---|---|---|---|
| 1 | $-CH_2CH_2OCOC_{17}H_{35}$ | $-CH_2CH_2OH$ | $-CH_2CH_2OH$ | $-CH_2CH_2OH$ | $5.1 \times 10^9$ | 1 | 1 |
| 2 | $-CH_2CH_2OCOC_{17}H_{35}$ | $-CH_2CH_2OH$ | $-CH_2CH_2OH$ | $-CH_2CH_2OCOC_{17}H_{35}$ | $2.3 \times 10^{10}$ | 1-2 | 1 |
| 3 | $-CH_2CH_2OCOC_{17}H_{35}$ | $-CH_2CH_2OH$ | $-CH_2CH_2OH$ | 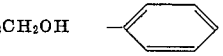 | $4.1 \times 10^{11}$ | 1 | 1 |
| 4 | $-CH_2CH_2OCOC_{17}H_{35}$ | $-CH_2CH_2OH$ | $-CH_2CH_2OH$ | 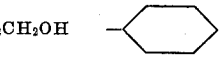 | $7.2 \times 10^{10}$ | 1-2 | 1 |
| 5 | $-CH_2CH_2OCOC_{17}H_{35}$ | $-CH_2CH(CH_3)OH$ | $-CH_2CH_2OH$ | $-CH_2CH_2OH$ | $4.2 \times 10$ | 1-2 | 1 |
| 6 | $-CH_2CH_2OCOC_{17}H_{35}$ | $-CH_3$ | $-CH_2CH_2OH$ | $-CH_2CH_2OH$ | $7.4 \times 10^{10}$ | 1 | 1 |
| 7 | $-COC_{17}H_{35}$ | $-CH_2CH_2OH$ | $-CH_2CH_2OH$ | $-CH_2CH_2OH$ | $3.2 \times 10^{10}$ | 1 | 1 |
| 8 | $-COC_{17}H_{35}$ | $-H$ | $-CH_2CH_2OH$ | $-CH_2CH_2OH$ | $8.1 \times 10^9$ | 2 | 1 |
| 9 | $-COC_{17}H_{35}$ | $-CH_2-\text{C}_6\text{H}_5$ | $-CH_2CH_2OH$ | $-CH_2-\text{C}_6\text{H}_5$ | $5.2 \times 10^{11}$ | 1-2 | 1 |
| 10 | $-CH_2CH_2OCOC_{17}H_{35}$ | $-CH_2CH_2OH$ | $-CH_2CH_2OH$ | $-CH_2CH_2OCOCH_3$ | $1.2 \times 10^{10}$ | 1-2 | 1 |
| 11 | $-CH_2CH_2OCOC_{11}H_{23}$ | $-CH_2CH_2OH$ | $-CH_2CH_2OH$ | $-C_{18}H_{37}$ | $2.3 \times 10^{12}$ | 1 | 1 |
| 12* | $-CH_2CH_2OH$ | $-CH_2CH_2OH$ | $-CH_2CH_2OH$ | $-CH_2CH_2OH$ | $4.2 \times 10^9$ | 4 | 4 |
| 13* | $C_{17}H_{35}N-CH_2CH_2OH$ $\quad\quad\;\;\vert$ $\quad\quad CH_2CH_2OH$ | | | | $3.8 \times 10^9$ | 5 | 4 |
| 14* | None | | | | $>10^{16}$ | 1 | 1 |

*Control runs; No. 13 is known antistatic agent.

Several comparative examples and control runs without the addition of an antistatic agent are also shown in the same table.

The following examples illustrate the effects of applying a combination of the antistatic agents of the formulas (I) and (II).

EXAMPLE 6

A predetermined amount each of the below-mentioned compounds was added to 100 parts of polypropylene having a melt flow index of 7, and they were uniformly mixed. Each of the obtained mixtures was pelletized in an extruder. The pellets obtained were fabricated into a 40 Ω thick film by the water cooling inflation method at a die temperature of 250° C. The fuming condition at the time of fabrication was observed. After a lapse of 1 week, the surface resistivity of each film was measured. The surface clouding index of each film was determined after a lapse of 1 week and 1 month respectively. The results obtained are shown in table 2.

The antistatic agents used in this example are listed below.

TABLE 2

| Run No. | Antistatic agent and amount used | | Surface resistivity (Ω) | Fuming index | Surface clouding index | | |
|---|---|---|---|---|---|---|---|
| | | | | | (a) | (b) | (c) |
| 1 | (1) 0.25 | (6) 0.25 | $7.3 \times 10^9$ | 1 | 1 | 2 | 3 |
| 2 | (2) 0.25 | (7) 0.25 | $6.7 \times 10^9$ | 1 | 1 | 2 | 3 |
| 3 | (3) 0.25 | (7) 0.25 | $6.2 \times 10^{10}$ | 1 | 1 | 2 | 3 |
| 4 | (4) 0.25 | (7) 0.25 | $8.2 \times 10^9$ | 1 | 1 | 2 | 2-3 |
| 5 | (2) 0.10 | (8) 0.10 | $2.2 \times 10^{11}$ | 1 | 1 | 1 | 2 |
| 6 | (5) 0.25 | (7) 0.50 | $8.5 \times 10^9$ | 1 | 1 | 2 | 3 |
| 7 | (2') 0.25 | (7) 0.25 | $9.0 \times 10^9$ | 1 | 1 | 1 | 2 |
| 8 | (2') 0.25 | (7') 0.25 | $5.1 \times 10^9$ | 1 | 1 | 1 | 1 |
| 9 | (3') 0.25 | (7') 0.25 | $2.1 \times 10^{10}$ | 1 | 1 | 1 | 1 |
| 10 | (4') 0.25 | (7') 0.25 | $1.0 \times 10^{10}$ | 1 | 1 | 1 | 1 |
| 11 | (2') 0.10 | (8') 0.10 | $9.2 \times 10^{10}$ | 1 | 1 | 1 | 1 |
| 12 | | (7) 0.50 | $8.5 \times 10^9$ | 4 | 2 | 5 | 5 |
| 13 | | (8) 0.25 | $3.2 \times 10^{13}$ | 3 | 1 | 4 | 5 |
| 14 | | (7') 0.50 | $1.2 \times 10^{10}$ | 4 | 1 | 3 | 4 |
| 15 | | (8') 0.25 | $8.2 \times 10^{12}$ | 3 | 1 | 2 | 3 |
| 16 | | | $>10^{16}$ | 1 | 1 | 1 | 1 | a After a week at 20° C.
b After a month at 20° C.
c After a week at 40° C.

NOTE.—Run Nos. 12–16 are control.

EXAMPLE 7

A predetermined amount each of the antistatic agents used in example 6 was kneaded with 100 parts of high density polyethylene having a melt index of 0.3, and the compositions obtained was pelletized. The pellets were blow molded by means of a hollow molding machine to form a 300 cc. bottle at a die temperature of 210° C.

The surface resistivity, surface clouding index and fuming index were measured in the same way as in example 6. The results are shown in table 3.

TABLE 3

| Run No. | Antistatic agent and amount used | | Surface resistivity ($\Omega$) | Fuming index | Surface clouding index | | |
|---|---|---|---|---|---|---|---|
| | | | | | (a) | (b) | (c) |
| 1 | (1) 0.1 | (6) 0.1 | $2.0 \times 10^{12}$ | 2 | 1 | 1 | 3 |
| 2 | (2) 0.1 | (4) 0.1 | $5.6 \times 10^{12}$ | 1 | 1 | 1 | 3 |
| 3 | (2) 0.1 | (7) 0.1 | $5.6 \times 10^{12}$ | 1 | 1 | 1 | 2 |
| 4 | (2') 0.1 | (7') 0.1 | $4.0 \times 10^{12}$ | 1 | 1 | 1 | 1 |
| 5 | | (4) 0.2 | $1.2 \times 10^{13}$ | 4 | 3 | 4 | 5 |
| 6 | | (7') 0.2 | $7.0 \times 10^{12}$ | 4 | 1 | 2 | 4 | a b c Same as above (Table 2).

EXAMPLE 8

A predetermined amount each of the antistatic agents used in example 6 was kneaded with 100 parts of low density polyethylene having a melt index of 3, and the resulting composition was pelletized. The pellets were molded into a film having a thickness of 40 $\mu$ using the inflation technique at a die temperature of 160° C.

The fuming index, surface resistivity, and surface clouding index of the obtained films were measured in the same way as in example 6. The results are shown in table 4.

TABLE 4

| Run No. | Antistatic agent and amount used | | Surface resistivity ($\Omega$) | Fuming index | Surface clouding index | | |
|---|---|---|---|---|---|---|---|
| | | | | | (a) | (b) | (c) |
| 1 | (1) 0.1 | (6) 0.1 | $7.2 \times 10^{10}$ | 1 | 1 | 1 | 2 |
| 2 | (2) 0.1 | (8) 0.1 | $6.5 \times 10^{11}$ | 1 | 1 | 1 | 2 |
| 3 | (2') 0.1 | (8') 0.1 | $5.0 \times 10^{11}$ | 1 | 1 | 1 | 1 |
| 4 | | (6) 0.2 | $1.4 \times 10^{12}$ | 2 | 3 | 4 | 5 |
| 5 | | (8') 0.2 | $5.0 \times 10^{11}$ | 2 | 1 | 2 | 3 | a b c Same as above (Table 2).

EXAMPLE 9

A predetermined amount each of the antistatic agents used in example 6 was kneaded with 100 parts of polystyrene having a melt index of 0.4, and the composition obtained was pelletized. The pellets were fabricated into a sheet on an injection molding machine at an injection temperature of 210° C. After allowing the sheets to stand for 48 hours in a constant temperature chamber maintained at 20° C. and a relative humidity of 65 percent, the surface resistivity of the sheets was measured. The results are shown in table 5 below.

TABLE 5

| Run No. | Antistatic agent and Amount used | | Surface resistivity($\Omega$) | Fuming index |
|---|---|---|---|---|
| 1 | (1)0.5 | (6)0.5 | $6.2 \times 10^{9}$ | 2 |
| 2 | (2)0.5 | (7)0.5 | $4.1 \times 10^{10}$ | 1 |
| 3 | — | (6)2.0 | $8.1 \times 10^{10}$ | 5 |
| 4 | — | (7)1.0 | $4.2 \times 10^{14}$ | 4 |

EXAMPLE 10

Thirty parts of dioctyl phthalate as plasticizer, 1.5 parts each of cadmium stearate and dibutyltin dilaurate as stabilizers, and a predetermined amount each of the antistatic agents used in example 6 were roll kneaded uniformly with 100 parts of polyvinyl chloride having a degree of polymerization of 1200. Each of the compositions obtained was press fabricated into sheet having a thickness of 5 mm. at a press temperature of 180° C.

The fuming index, surface resistivity, and surface clouding index of each sheet were measured in the same way as in example 9. The results are shown in table 6.

TABLE 6

| Run No. | Antistatic agent and amount used | | Surface resistivity ($\Omega$) | Fuming index | Surface clouding index | | |
|---|---|---|---|---|---|---|---|
| | | | | | (a) | (b) | (c) |
| 1 | (1) 0.25 | (6) 0.25 | $8.1 \times 10^{11}$ | 1 | — | — | — |
| 2 | (2) 0.50 | (7) 0.50 | $5.2 \times 10^{10}$ | 2 | 1 | 2 | 3 |
| 3 | (2') 0.50 | (7') 0.50 | $3.1 \times 10^{10}$ | 2 | 1 | 1 | 1 |
| 4 | | (7) 0.50 | $2.4 \times 10^{13}$ | 2 | 1 | 1 | 2 |
| 5 | | (7') 0.10 | $5.1 \times 10^{11}$ | 3 | 1 | 2 | 3 |
| 6 | | | $>10^{15}$ | 1 | 1 | 1 | 1 | a b c Same as above (Table 2).

The following examples will illustrate the effects of the present invention in stretched thermoplastic resins.

EXAMPLE 11

A predetermined amount each of the antistatic agents mentioned below was mixed uniformly with 100 parts of polypropylene having a melt flow index of 2, and each of the compositions obtained was pelletized on an extruder. The pellets were fabricated in to a T-die film by means of an extruder. The film was stretched both vertically and transversely to form a biaxially oriented film having a thickness of 15 $\mu$. The fabricating conditions were as follows:

| T-die extrusion temperature: | 280° C. |
|---|---|
| Vertical stretching temperature: | 135° C. |
| ratio: | 5 |

The fuming condition at the time of fabrication was observed. The films were allowed to stand for a week after fabrication in a constant temperature chamber maintained at 20° C. and a relative humidity of 65 percent. Thereafter, the surface resistivity measurement of the film and the ash test were conducted. The film was maintained in contact with newspaper, and its surface clouding was determined after a lapse of one week and one month respectively. The results were as shown in table 7.

The antistatic agents used are listed below.

Compounds of the general formula (I) wherein four substituents, A, B, D and E are as follows:

Compound No.

1. A and D=—CH$_2$CH$_2$OH B and E=—CH$_2$CH$_2$OCO—n—C$_{17}$H$_{35}$
1'. A and D=—CH$_2$CH$_2$OH B and E=—CH$_2$CH$_2$OCO—iso—C$_{17}$H$_{35}$
2. A=—CH$_2$CH$_2$OH B, D and E=—CH$_2$CH$_2$OCO—n—C$_{17}$H$_{35}$
2'. A=—CH$_2$CH$_2$OH B, D and E=—CH$_2$CH$_2$OCO—iso—C$_{17}$H$_{35}$
3. A, B, D and E=—CH$_2$CH$_2$OCO—n—C$_{17}$H$_{35}$
3'. A, B, D and E=—CH$_2$CH$_2$OCO—iso—C$_{17}$H$_{35}$
4. A and D=—CH$_2$CH$_2$OCO—n—C$_{17}$H$_{35}$ B and E=—CO—n—C$_{17}$H$_{35}$
5. A, B and D=—CH$_2$CH$_2$OCO—n—C$_{17}$H$_{35}$ E=—CO—n—C$_{17}$H$_{35}$
6. A, B, D and E=—CH$_2$CH$_2$OCO—n—C$_{21}$H$_{43}$ Compounds of the formula (II) wherein symbols are as follows:

Compound No.

7. X=—n—C$_{17}$H$_{35}$; R and R'=—H; p and q=1
7'. X=—iso—C$_{17}$H$_{35}$; R and R'=—H; p and q=1
8. X=—CO—n—C$_{17}$H$_{35}$; R and R'=—H; p and q=1
8'. X=—CO—iso—C$_{17}$H$_{35}$; R and R'=—H; p and q=1

TABLE 7

| Run No. | Antistatic agent and amount used | | | | Surface resistivity Ω | Ash test mm. | Fuming index | Surface clouding index (a) | (b) | (c) |
|---|---|---|---|---|---|---|---|---|---|---|
| 1 | (1) | 0.5 | (7) | 0.5 | $3.2 \times 10^{12}$ | 0 | 1 | 1 | 2 | 2-3 |
| 2 | (2) | 0.5 | (7) | 0.5 | $4.3 \times 10^{11}$ | 0 | 1 | 1 | 2 | 2-3 |
| 3 | (3) | 0.5 | (7) | 0.5 | $6.2 \times 10^{10}$ | 0 | 1-2 | 1 | 2 | 3 |
| 4 | (4) | 0.5 | (7) | 0.5 | $6.2 \times 10^{11}$ | 0 | 2 | 1-2 | 2-3 | 3 |
| 5 | (5) | 0.5 | (7) | 0.5 | $2.1 \times 10^{13}$ | 3 | 1-2 | 1 | 2 | 2-3 |
| 6 | (3) | 0.5 | (8) | 0.5 | $3.6 \times 10^{10}$ | 0 | 1-2 | 1 | 2 | 3 |
| 7 | (6) | 0.5 | (7) | 0.5 | $3.0 \times 10^{13}$ | 5 | 1 | 1 | 1 | 2 |
| 8 | (1') | 0.5 | (7') | 0.5 | $3.2 \times 10^{12}$ | 0 | 1 | 1 | 1 | 1 |
| 9 | (2') | 0.5 | (7') | 0.5 | $4.2 \times 10^{11}$ | 0 | 1 | 1 | 1 | 1 |
| 10 | (3') | 0.5 | (7') | 0.5 | $6.2 \times 10^{10}$ | 0 | 1-2 | 1 | 1 | 1 |
| 11 | (3') | 0.5 | (8') | 0.5 | $3.6 \times 10^{10}$ | 0 | 1-2 | 1 | 1 | 1 |
| 12 | (3') | 0.5 | (7) | 0.5 | $4.1 \times 10^{10}$ | 0 | 1-2 | 1 | 1 | 2 |
| 13 | (4') | 0.5 | (7') | 0.5 | $2.1 \times 10^{13}$ | 3 | 1-2 | 1 | 1 | 2 |
| 14 | | | (7) | 0.5 | $>10^{16}$ | 30 | 3 | 2 | 3 | 5 |
| 15 | | | (7) | 1.0 | $4.8 \times 10^{13}$ | 5 | 5 | 3 | 5 | 5 |
| 16 | | | | | $>10^{16}$ | 70 | 1 | 1 | 1 | 1 | a,b,c Same as above (Table 2).

EXAMPLE 12

A predetermined amount each of the antistatic agents used in example 11 was mixed uniformly with 100 parts of high density polyethylene having a melt index of 0.6, and each of the obtained compositions was pelletized. The pellets were fabricated into a film having a thickness of 40 μ by the inflation technique. The films was stretched on a rotary roll type dry stretcher to form a stretched tape having a width of 0.7 cm.

Fabricating conditions

| | |
|---|---|
| Film fabrication temperature: | 240° C. |
| Stretching temperature: | 115° C. |
| speed: | 150 m/min. |
| ratio: | 7 |

The fuming condition at the time of fabrication was observed. The antistatic properties of the tape obtained were determined after a lapse of 1 week in accordance with the ash test and the discharge period measurement of electrostatic charge. The discharging period was measured using a static honest meter and expressed by a time in second during which an initially charged 10,000 volts decreased to 5,000 volts (half period). The results obtained are given in table 8.

TABLE 8

| Run No. | Antistatic agent and Amount used | | Half period (sec.) | Ash test (mm.) | Fuming index |
|---|---|---|---|---|---|
| 1 | (1) 0.5 | (7) 0.5 | 0.5 | 0 | 1 |
| 2 | (3) 0.5 | (7) 0.5 | 0.2 | 0 | 1 |
| 3 | (1') 0.5 | (7') 0.5 | 0.4 | 0 | 1 |
| 4 | (3') 0.5 | (7' ) 0.5 | 0.2 | 0 | 1 |
| 5 | — | (7) 1.0 | 1.2 | 0 | 3 |
| 6 | — | (7') 1.0 | 1.5 | 0 | 3 |
| 7 | — | — | ∞ | 60 | 1 |

EXAMPLE 13

A predetermined amount each of the antistatic agents nos. (1), (3) and (7) used in example 11 was mixed uniformly with 100 parts of polypropylene having a melt flow index of 3, and each of the compositions obtained was pelletized. The pellets were extruded from a nozzle with a diameter of 1.0 mm. of an extruder, and drawn on a rotary roll wet type drawing machine to form a 350 denier filament.

Fabricating conditions:

| | |
|---|---|
| Extrusion temperature: | 240° C. |
| Drawing temperature: | 100° C. |
| rate: | 120 m./min. |
| ratio: | 8 |

The fuming condition at the time of fabrication was observed. The antistatic properties of the filament after a lapse of 1 week are shown in table 9.

TABLE 9

| Run No. | Antistatic agent and Amount used | | Half period (sec.) | Ash test (mm.) | Fuming index |
|---|---|---|---|---|---|
| 1 | (1) 0.5 | (7) 0.5 | 0.8 | 0 | 1 |
| 2 | (3) 0.5 | (7) 0.5 | 0.1 | 0 | 1 |
| 3 | — | (7) 1.0 | 1.2 | 0 | 3 |
| 4 | — | — | ∞ | 60 | 1 |

What we claim is:

1. A composition of matter comprising a thermoplastic resin and, as an antistatic agent, from 0.01 to 10 parts per 100 parts by weight of the thermoplastic resin, of at least one N,N'-substituted xylylene diamine of the formula

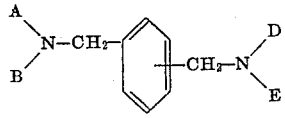

wherein substituents A, B, D and E are each:

(a) $-(CH_2-\underset{R}{CHO})_m-\underset{\parallel}{\overset{\parallel}{C}}-R^1$
$\phantom{-(CH_2-CHO)_m-C}O$ (b) $-(CH_2-\underset{R}{CHO})_n-\underset{\parallel}{\overset{\parallel}{C}}-R^2$
$\phantom{-(CH_2-CHO)_n-C}O$ (c) $-(CH_2-\underset{R}{CHO})_nH$, d. $-R^3$, or e. $-R^4$ wherein R is a hydrogen atom or a methyl group, $R^1$ is a linear or branched alkyl or alkenyl group having 11-21 carbon atoms, $R^2$ is a linear or branched alkyl or alkenyl group having one to 10 carbon atoms, $R^3$ is a linear or branched alkyl or alkenyl group having one to 21 carbon atoms, $R^4$ is a hydrogen atom, a cycloalkyl group, an aralkyl group or an aryl group, $m$ is an integer of from 0 to 5, and $n$ is an integer of from 1 to 5, with the proviso that at least one of the substituents A, B, D and E is the radical (a).

2. The composition of claim 1 wherein said N,N'-substituted xylylene diamine is N,N,N'-tris(β-hydroxyethyl)-N'-β-n(or iso)-stearoyloxyethyl xylylene diamine, N,N,N'-tris(β-hydroxyethyl)-N'-β-n-lauroyloxyethyl xylylene diamine, N,N'-bis(β-hydroxyethyl)-N,N'-bis(β-n(or iso)-stearoyloxyethyl)xylylene diamine, or N,N'-bis(β-n-lauroyloxyethyl)xylylene diamine.

3. A composition of matter comprising a thermoplastic resin and, as antistatic agents, (I) at least one N,N'-substituted xylylene diamine of the formula

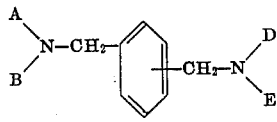

wherein substituents A, B, D and E are each:

(a) $-(CH_2-CHO)_m-C-R^1$
       $\quad\quad\quad\ \ |\quad\quad\ \ ||$
       $\quad\quad\quad\ \ R\quad\quad\ O$ (b) $-(CH_2-CHO)_n-C-R^2$
       $\quad\quad\quad\ \ |\quad\quad\ \ ||$
       $\quad\quad\quad\ \ R\quad\quad\ O$ (c) $-(CH_2-CHO)_nH,$
       $\quad\quad\quad\ \ |$
       $\quad\quad\quad\ \ R$ d. $-R^3$, or
e. $-R^4$ wherein R is a hydrogen atom or a methyl group, $R^1$ is a linear or branched alkyl or alkenyl group having 11-21 carbon atoms, $R^2$ is a linear or branched alkyl or alkenyl group having one to 10 carbon atoms, $R^3$ is a linear or branched alkyl or alkenyl group having one to 21 carbon atoms, $R^4$ is a hydrogen atom, a cycloalkyl group, an aralkyl group or an aryl group, m is an integer of from 0 to 5, and n is an integer of from 1 to 5, wherein at least two of the substituents A, B, D and E are the radical (a),

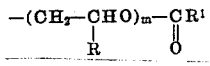

and (II) at least one N-substituted amine or amide of the formula

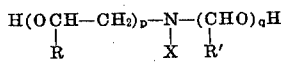

wherein R and R' are each a hydrogen atom or a methyl group, X is a linear or branched alkyl or aliphatic acyl group having 11-22 carbon atoms, and p and q are integers of from 1 to 5, the amount of component (I) being 0.05 to 10 parts by weight per 100 parts of the thermoplastic resin, the amount of component (II) being 0.01 to 2 parts by weight per 100 parts of the thermoplastic resin, and the weight ratio of components (I) to (II) being in the range of 9:1 to 3:7.

4. The composition of claim 3 wherein said N,N'-substituted xylylene diamine is N,N,N',N'-tetrakis(β-n(or iso)-stearoyloxyethyl)xylylene diamine, N,N,N',N'-tetrakis(β-n-lauroyloxyethyl) xylylene diamine, N,N,N'-tris(β-n(or iso)-stearoyloxyethyl)-N'-β-hydroxyethylxylylene diamine, or N,N,N'-tris(β-lauroyloxyethyl)-N'-β-hydroxyethyl xylylene diamine.

5. The composition of claim 3 wherein said N-substituted amine or amide is N,N-bis(β-hydroxyethyl)-n(or iso)-stearyl amine or N,N-bis(β-hydroxyethyl)-n(or iso)-stearoyl amide.

6. A stretched material of a thermoplastic resin containing, as an antistatic agent, (I) at least one N,N'-substituted xylylene diamine of the formula

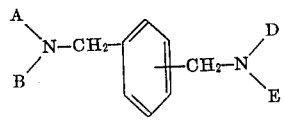

wherein substituents A, B, D and E are each:

(a) $-(CH_2-CHO)_m-C-R^1$
       $\quad\quad\quad\ \ |\quad\quad\ \ ||$
       $\quad\quad\quad\ \ R\quad\quad\ O$ (b) $-(CH_2-CHO)_n-C-R^2$
       $\quad\quad\quad\ \ |\quad\quad\ \ ||$
       $\quad\quad\quad\ \ R\quad\quad\ O$ (c) $-(CH_2-CHO)_nH,$
       $\quad\quad\quad\ \ |$
       $\quad\quad\quad\ \ R$ d. $-R^3$, or
e. $-R^4$ wherein R is a hydrogen atom or a methyl group, $R^1$ is a linear or branched alkyl or alkenyl group having 11-21 carbon atoms, $R^2$ is a linear or branched alkyl or alkenyl group having one to 10 carbon atoms, $R^3$ is a linear or branched alkyl or alkenyl group having one to 21 carbon atoms, $R^4$ is a hydrogen atom, a cycloalkyl group, an aralkyl group or an aryl group, m is an integer of from 0 to 5, and n is an integer of from 1 to 5, wherein at least two of the substituents A, B, D and E are the radical (a) and (II) at least one N-substituted amine or amide of the formula

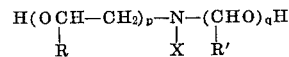

wherein R and R' are each a hydrogen atom or a methyl group, X is a linear or branched alkyl or aliphatic acyl group having 11-22 carbon atoms, and p and q are integers of from 1 to 5, the amount of component (I) being 0.1 to 10 parts by weight per 100 parts of the thermoplastic resin, the amounts of component (II) being 0.01 to 2 parts by weight per 100 parts of the thermoplastic resin, and the weight ratio of the components (I) to (II) being in the range of 9:1 to 3:7.

7. The material of claim 6 wherein said N,N'-substituted xylylene diamine is N,N,N',N'-tetrakis(β-iso-stearoyloxyethyl) xylylene diamine, and said N-substituted amide is N,N'-bis(β-hydroxyethyl) iso-stearoylamide.

8. The material of claim 6 wherein said N,N'-substituted xylylene diamine is N,N,N',N'-tetrakis(β-iso-stearoyloxyethyl) xylylene diamine, and said N-substituted amine is N,N'-bis(β-hydroxyethyl) iso-stearylamine.

9. The composition of claim 6 wherein said N,N'-substituted xylylene diamine is N,N,N',N'-tetrakis(β-n(or iso)-stearoyloxyethyl) xylylene diamine, N,N,N',N'-tetrakis(β-n-lauroyl-oxyethyl) xylylene diamine, N,N,N'-tris(β-n(or iso)-stearoyloxyethyl)-N'-β-hydroxyethyl xylylene diamine, or N,N,N'-tris(β-lauroyloxyethyl)-N'-β-hydroxyethyl xylylene diamine.

10. The composition of claim 6 wherein said N-substituted amine or amide is N,N-bis(β-hydroxyethyl)-n(or iso)-stearyl amine or N,N-bis(β-hydroxyethyl-n(or iso)-stearoyl amide.

* * * * *